3,328,417
HETEROCYCLYLPHENOXY-PROPANOLAMINES
AND DERIVATIVES THEREOF
Bernard Joseph McLoughlin and Leslie Harold Smith, Macclesfield, England, assignors to Imperial Chemical Industries Limited, London, England, a corporation of Great Britain
No Drawing. Filed Feb. 11, 1965, Ser. No. 431,970
Claims priority, application Great Britain, Mar. 9, 1964, 9,852/64
6 Claims. (Cl. 260—307)

This invention relates to new alkanolamine derivatives which possess β-adrenergic blocking activity and which are therefore useful in the treatment or prophylaxis of heart diseases, for example angina pectoris and cardiac arrhythmias, and in the treatment of hypertension and phaeochromocytoma.

According to the invention we provide alkanolamine derivatives of the formula:

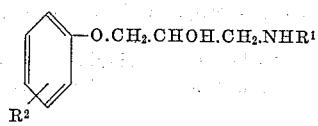

wherein $R^1$ stands for an alkyl, cycloalkyl, alkenyl or aralkyl radical, any of which may optionally be substituted, and $R^2$ stands for a heterocyclic radical, optionally substituted, and the esters thereof, and the salts thereof.

It is to be understood that the above definition of alkanolamine derivatives encompasses all possible stereoisomers thereof, and mixtures thereof.

As a suitable value for $R^1$ when it stands for an alkyl radical there may be mentioned, for example, an alkyl radical of not more than 12 carbon atoms, for example the ethyl, n-propyl, isopropyl, s-butyl, t-butyl or 1,1-dimethyloctyl radical. As a suitable value for $R^1$ when it stands for a substituted alkyl radical there may be mentioned, for example, a hydroxyalkyl radical of not more than 12 carbon atoms. As a suitable value for $R^1$ when it stands for an aralkyl radical, optionally substituted, there may be mentioned, for example, an aralkyl radical of not more than 15 carbon atoms, optionally substituted with one or more hydroxy, halogen or alkoxy radicals, for example alkoxy radicals of not more than 5 carbon atoms. Thus, specific values for $R^1$ when it stands for a substituted alkyl radical or for an aralkyl radical are the 2-hydroxy-1,1-dimethylethyl or 1-methyl-3-phenylpropyl radical. As a suitable value for $R^1$ when its stands for a cycloalkyl radical there may be mentioned, for example, a cycloalkyl radical of not more than 10 carbon atoms, for example the cyclopentyl radical. As a suitable value for $R^1$ when its stands for an alkenyl radical there may be mentioned, for example, an alkenyl radical of not more than 6 carbon atoms, for example the allyl radical.

As a suitable value for $R^2$ there may be mentioned a monocyclic or polycyclic heteroaromatic radical, optionally substituted, for example such a radical containing one or more oxygen, nitrogen and/or sulphur atoms as hetero-atoms, optionally substituted. Thus $R^2$ may stand for a heteroaromatic radical consisting of or containing a 5- or 6-membered heteroaromatic ring containing one or more oxygen, nitrogen and/or sulphur atoms as hetero-atoms, optionally substituted, for example a 2-pyridyl, 2-indolyl, 2-benzoxazolyl, 2-benzthiazolyl, 2-quinolyl, 2-quinoxalyl, 4-thiazolyl or 3-thienyl radical, any of which may optionally be substituted with one or more alkyl radicals of not more than 5 carbon atoms, for example the methyl radical.

As suitable alkanolamine esters there may be mentioned, for example, O-esters derived from a saturated or unsaturated aliphatic carboxylic acid, for example a saturated or unsaturated aliphatic carboxylic acid of not more than 6 carbon atoms, for example acetic acid, or O-esters derived from an aromatic carboxylic acid, for example an aromatic carboxylic acid of not more than 10 carbon atoms, for example benzoic acid, and the salts of the said O-esters.

Specific compounds of the present invention are, for example,

1-[2-(2-indolyl)phenoxy]-3-isopropylamino-2-propanol,
1-[2-(2-benezoxazolyl)phenoxy]-3-isopropylamino-2-propanol,
1-[2-(2-benzthiazolyl)phenoxy]-3-isopropylamino-2-propanol,
1-[2-(2-benzoxazolyl)phenoxy]-3-(2-hydroxy-1,1-dimethylethylamino)-2-propanol,
1-[2-(2-benzoxazolyl)phenoxy]-3-t-butylamino-2-propanol,
1-[2-(2-benzthiazolyl)phenoxy]-3-(1-methyl-3-phenylpropylamino)-2-propanol and
2-[2-(2-benzoxazolyl)phenoxyl]-1-(isopropylaminomethyl)ethyl acetate, and the salts thereof.

As sutiable salts of the alkanolamine derivatives of the invention there may be mentioned acid-addition salts, for example salts derived from inorganic acids, for example hydrochlorides, hydrobromides, phosphates, or sulphates, or salts derived from organic acids, for example, oxalates, lactates, tartrates, acetates, salicylates, citrates, benzoates, β-naphthoates, adipates or 1,1'-methylene-bis-(2-hydroxy-3-naphthoates), or salts derived from acidic synthetic resins, for example sulphonated polystyrene resins, for example, "Zeo-Karb" 225 ("Zeo-Karb" is a trademark). Relatively insoluble salts, for example the 1,1'-methylene-bis-(2-hydroxy-3-naphthoates) have the advantage that they afford prolonged blood levels of the medicament.

According to a further feature of the invention we provide a process for the manufacture of the alkanolamine derivatives of the invention which comprises the interaction of a compound of the formula:

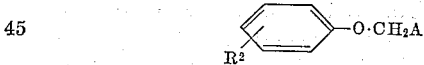

wherein $R^2$ has the meaning stated above, and A stands for the group

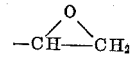

or —CHOH.CH$_2$Z, wherein Z stands for a halogen atom, with an amine of the formula NH$_2$R$^1$, wherein $R^1$ has the meaning stated above.

As a suitable value for Z there may be mentioned, for example, a chlorine or bromine atom. The interaction may be accelerated or completed by the application of heat, it may be carried out at atmospheric or elevated pressure, and it may be carried out in an inert diluent or solvent, for example ethanol.

According to a further feature of the invention we provide a process for the manufacture of alkanolamine esters of the invention which comprises the interaction of the appropriate alkanolamine derivative, or a salt thereof, with an acylating agent.

As suitable acylating agents there may be mentioned acid halides or anhydrides derived from saturated or unsaturated aliphatic carboxylic acids, for example acetyl chloride, or from aromatic carboxylic acids. The acylation may be carried out in a diluent or solvent, which, in the case where an acid anhydride is used as acylating agent, may conveniently be the acid from which the anhydride is derived.

As stated above, the alkanolamine derivatives of the present invention are of value in the treatment or prophylaxis of heart diseases and in the treatment of hypertension and phaeochromocytoma.

According to a further feature of the invention, therefore, we provide pharmaceutical compositions comprising as active ingredient one or more alkanolamine derivatives of the invention, or an ester or esters thereof, or a salt or salts thereof, together with a pharmaceutically-acceptable diluent or carrier.

As suitable compositions there may be mentioned for example, tablets, capsules, aqueous or oily solutions, aqueous or oily suspensions, emulsions, injectable aqueous or oily solutions or suspensions, and dispersible powders.

The invention is illustrated but not limited by the following examples in which the parts are by weight:

Example 1

1 part of 1,2-epoxy-3-[2-(2-indolyl)phenoxy]propane is dissolved in 15 parts of isopropylamine and the mixture is heated under reflux during one hour. Excess of isopropylamine is removed by distillation, the residue is dissolved in 50 parts of 2 N-hydrochloric acid, and the solution is washed twice with 20 parts of ether. The aqueous solution is basified with 2 N-sodium hydroxide solution and the mixture is extracted three times with 50 parts of ether. The combined ethereal solutions are washed with 50 parts of water, dried over anhydrous magnesium sulphate, and the ether is removed by distillation. The residue is crystallised from cyclohexane, and there is thus obtained 1-[2-(2-indolyl)phenoxy]-3-isopropylamino-2-propanol, M.P. 132–134° C.

The 1,2-epoxy-3-[2-(2-indolyl)phenoxy]propane used as starting material in this example may be obtained as follows:

1.045 parts of 2-(2-hydroxyphenyl)indole are dissolved in a solution of 0.24 part of sodium hydroxide in 20 parts of water, and 0.65 part of epichlorohydrin is added, the temperature of the mixture not being allowed to exceed 20° C. during the addition. The mixture is stirred at a temperature not exceeding 20° C. during 18 hours. The mixture is extracted three times with 30 parts of chloroform, and the combined chloroform extracts are washed successively with 20 parts of 2 N-sodium hydroxide solution and with 20 parts of water, and dried over anhydrous magnesium sulphate. The chloroform is removed from the dry solution by evaporation; the residue thus obtained consists of 1,2-epoxy-3-[2-(2-indolyl)phenoxy]propane.

2-(2-hydroxyphenyl)indole may be obtained as follows:

An intimate mixture of 4.3 parts of 2-hydroxyacetophenone phenylhydrazone and 24 parts of granular zinc chloride is carefully fused and the molten mixture is then heated just above the melting point during 10 minutes. The molten mass is poured into 100 parts of cold 0.3 N-hydrochloric acid and the mixture is heated with stirring at 95° C. during 1 hour. The cooled mixture is filtered and the solid residue is dried in air. The dry solid is thoroughly extracted with boiling cyclohexane. The cyclohexane extract is cooled and filtered. The solid residue is crystallised from cyclohexane, and there is thus obtained 2-(2-hydroxyphenyl)indole, M.P. 175–176° C.

Example 2

A mixture of 2 parts of 1-[2-(2-benzoxazolyl)phenoxy]-3-chloro-2-propanol, 10 parts of isopropylamine and 10 parts of ethanol is heated in a sealed vessel at 100° C. for 10 hours. The mixture is then evaporated to dryness under reduced pressure and the residue is shaken together with 25 parts of 2 N-hydrochloric acid and 50 parts of ether. The mixture is separated, the aqueous phase is made alkaline with 2 N-sodium hydroxide solution, and the mixture is extracted with 50 parts of ether. The ethereal extract is dried over anhydrous magnesium sulphate, and then evaporated to dryness. The residue is crystallised from n-hexane, and there is obtained 1-[2-(2-benzoxazolyl)phenoxy] - 3 - isopropylamino-2-propanol, M.P. 106–107° C.

The 1-[2-(2-benzoxazolyl)phenoxy]-3-chloro-2-propanol used as starting material may be obtained as follows:

A mixture of 8 parts of 2-(2-hydroxyphenyl)benzoxazole, 20 parts of epichlorohydrin and 0.1 part of piperidine is heated at 90° C. for 6 hours. The mixture is evaporated to dryness under reduced pressure. The residue consists of 1-[2-(2-benzoxazolyl)phenoxy]-3-chloro-2-propanol.

Example 3

A mixture of 3.1 parts of 1-[2-(2-benzthiazolyl)-phenoxy]-3-chloro-2-propanol and 10 parts of isopropylamine is heated in a sealed vessel at 100° C. for 10 hours. The excess of isopropylamine is then removed by distillation under reduced pressure. The residue is stirred with 25 parts of 2N-sodium hydroxide solution and the mixture is extracted with 50 parts of ethyl acetate. The ethyl acetate extract is chilled, and the resulting mixture is filtered. The solid residue is crystallised from ethanol and there is thus obtained 1-[2-(2-benzthiazolyl)phenoxy]-3-isopropylamino - 2 - propanol hemihydrate, M.P. 125–126° C.

The 1 - [2 - (2 - benzthiazolyl)phenoxy] - 3 - chloro-2-propanol used as starting material may be obtained as follows:

A mixture of 11 parts of 2-(2-hydroxyphenyl)-benzthiazole, 25 parts of epichlorohydrin and 0.125 part of piperidine is heated at 90° C. for 6 hours. The mixture is evaporated to dryness under reduced pressure. The residue consists of 1-[2-(2-benzthiazolyl)-phenoxy]-3-chloro-2-propanol.

Example 4

A mixture of 1 part of 1-chloro-3[2-(2-quinolyl)phenoxy]-2-propanol, 5 parts of ethanol and 10 parts of isopropylamine is heated in a sealed vessel at 100° C. for 10 hours. The mixture is evaporated to dryness under reduced pressure, the residue is dissolved in 25 parts of 2 N-hydrochloric acid and basified with 2 N-sodium hydroxide solution. The mixture is extracted with 25 parts of ether, and the ethereal extract is dried over anhydrous magnesium sulphate, the mixture is filtered and the filtrate evaporated to dryness. To the residue is added an excess of ethanolic picric acid, and the mixture is kept at ambient temperature for 16 hours and then filtered. The solid residue is crystallised from ethanol, and there is thus obtained 1 - isopropylamino-3-[2-(2-quinolyl)phenoxy]-2-propanol dipicrate, M.P. 162–164° C.

The 1-chloro-3-[2-(2-quinolyl)phenoxy) - 2 -propanol used as starting material may be obtained as follows:

1 part of 2-(2-hydroxyphenyl)quinoline, 4 parts of epichlorohydrin and 0.01 part of piperidine is heated at 90° C. for 6 hours. The mixture is evaporated to dryness under reduced pressure. As much as possible of the residue is dissolved in 5 parts of ethanol, the mixture is filtered, and the filtrate is evaporated to dryness. The residue consists of 1-chloro-3-[2-(2-quinolyl)phenoxy]-2-propanol.

Example 5

A mixture of 2.7 parts of 1,2-epoxy-3-[2-(2-quinoxalyl)phenoxy]propane and 10 parts of isopropylamine is heated under reflux for 2 hours. The mixture is then evaporated to dryness under reduced pressure and the residue is shaken together with 25 parts of 2 N-hydrochloric acid and 25 parts of ether. The mixture is separated, the aqueous phase is made alkaline with 2 N-sodium hydroxide solution, and the mixture is extracted with 50 parts of ethyl acetate. The mixture is separated and the ethyl acetate phase is evaporated to dryness under reduced pressure. To the residue is added an excess of ethanolic picric acid, and the mixture is filtered. The solid residue is washed with cold ethanol and crystallised from isopropanol. There is thus obtained 1-isopropylamino - 3-[2-(2-quinoxalyl)-phenoxy]-2-propanol dipicrate, M.P. 168–170° C.

The 1,2 - epoxy - 3-[2-(2-quinoxalyl)phenoxy]-propane used as starting material is obtained as follows:

To a stirred mixture of 2 parts of 2-(2-hydroxyphenyl) quinoxaline, 1.4 parts of epichlorohydrin, 10 parts of methanol and 2.5 parts of water at 60° C. there is added a solution of 0.2 part of sodium hydroxide in 2.5 parts of water. The mixture is heated under reflux for two hours, and is then evaporated to dryness under reduced pressure. There is thus obtained 1,2-epoxy-3[2-(2-quinoxalyl)phenoxyl]propane.

*Example 6*

A mixture of 1.5 parts of 1-[4-(2-benzthiazolyl)phenoxy]-3-chloro-2-propanol, 10 parts of isopropylamine and 10 parts of ethanol is heated in a sealed vessel at 100° C. for 10 hours. The excess of isopropylamine is then removed by distillation under reduced pressure. The residue is stirred with 25 parts of 2 N-hydrochloric acid and 25 parts of ether. The mixture is separated, the aqueous phase is made alkaline with 2 N-sodium hydroxide solution, and the mixture is filtered. The solid residue is washed with water, dried, and then crystallised from cyclohexane. There is thus obtained 1-[4-(2-benzthiazolyl)phenoxy] - 3 - isopropylamino-2-propanol, M.P. 142–144° C.

The 1-[4-(2-benzthiazolyl)phenoxy]-3-chloro-2-propanol used as starting material may be obtained as follows:

A mixture of 1.1 parts of 2-(4-hydroxyphenyl)-benzthiazole, 2 parts of epichlorohydrin and 0.01 part of piperidine is heated at 90° C. for 6 hours. The mixture is evaporated to dryness under reduced pressure. The residue consists of 1 - [4-(2-benzthiazolyl)phenoxy]-3-chloro-2-propanol.

*Example 7*

A mixture of 1.5 parts of 1-[2-(2-benzthiazolyl)-phenoxy]-3-chloro-2-propanol and 5 parts of allylamine is heated in a sealed vessel at 100° C. for 10 hours. The mixture is evaporated to dryness under reduced pressure, and the residue is shaken together with 25 parts of 2 N-hydrochloric acid and 25 parts of ethyl acetate. The mixture is separated, the aqueous phase is made alkaline with 2 N-sodium hydroxide solution, and the mixture is extracted with 25 parts of ethyl acetate. The ethyl acetate extract is dried over anhydrous magnesium sulphate and acidified with ethereal oxalic acid. The mixture is filtered, and the solid residue is crystallised from water. There is thus obtained 1-allylamino-3-[2-(2-benzthiazolyl)-phenoxy]-2-propanol hydrogen oxalate, M.P. 195–196° C.

*Example 8*

A mixture of 1.5 parts of 1-[2-(2-benzthiazolyl)-phenoxy]-3-chloro-2-propanol and 1.5 parts of 1-methyl-3-phenylpropylamine is heated at 100° C. for 10 hours. To the residue there are added 25 parts of hot ethyl acetate, and the mixture is filtered. The filtrate is acidified with ethereal hydrochloric acid and the mixture is filtered. The solid residue is washed with ethyl acetate and crystallised from ethanol. There is thus obtained 1-[2-(2-benzthiazolyl) - phenoxy] - 3 - (1 - methyl - 3 - phenylpropylamino) - 2 - propanol hydrochloride hemihydrate, M.P. 236° C.

*Example 9*

A mixture of 1.5 parts of 1-[2-(2-benzthiazolyl)-phenoxy]-3-chloro-2-propanol and 5 parts of cyclopentylamine is heated in a sealed vessel at 100° C. for 10 hours. The mixture is evaporated to dryness under reduced pressure and the residue is crystallised from cyclohexane. There is thus obtained 1-[2-(2-benzthiazolyl)phenoxy]-3-cyclopropylamino-2-propanol, M.P. 104–106° C.

*Example 10*

A mixture of 2.5 parts of 1-[2-(2-benzoxazolyl)-phenoxy]-3-chloro-2-propanol and 10 parts of t-butylamine is heated in a sealed vessel at 100° C. for 10 hours. The mixture is then evaporated to dryness under reduced pressure and the residue is extracted with ethyl acetate. The ethyl acetate extract is filtered and the filtrate is acidified with ethereal hydrochloric acid. The mixture is filtered and the residue is crystallised from a mixture of n-propanol and ethyl acetate. There is thus obtained 1-[2 - (2 - benzoxazolyl)phenoxy] - 3 - t - butylamino - 2-propanol dihydrochloride, M.P. 150–152° C. with decomposition.

*Example 11*

A mixture of 1.25 parts of 1-[2-(2-benzoxazolyl)phenoxy]-3-chloro-2-propanol and 0.8 part of 1,1-dimethyloctylamine is heated at 100° C. for 10 hours. The mixture is extracted with ether and the ethereal extract is filtered. The filtrate is acidified with ethereal oxalic acid and the mixture is kept at ambient temperature for 16 hours and is then filtered. The solid residue is crystallised from a mixture of ethyl acetate and ethanol, and there is thus obtained 1 - [2 - (2 - benzoxazolyl)phenoxy] - 3 - (1,1-dimethyloctylamino)-2-propanol oxalate hemihydrate, M.P. 166° C. with decomposition.

*Example 12*

A mixture of 1.8 parts of 1-[2-(2-benzoxazolyl)phenoxy]-3-chloro-2-propanol and 1 part of 2-amino-2-methylpropanol is heated in a sealed vessel at 100° C. for 10 hours. The mixture is then evaporated to dryness under reduced pressure and the residue is shaken together with 25 parts of 2 N-hydrochloric acid and 25 parts of ether. The mixture is separated, the aqueous phase is made alkaline with 2 N-sodium hydroxide solution, and the mixture is extracted with 50 parts of ethyl acetate. The ethyl acetate extract is dried over anhydrous magnesium sulphate and acidified with a saturated solution of oxalic acid in ethyl acetate. The mixture is filtered and the solid residue is crystallised from n-propanol. There is thus obtained 1-[2-(2-benzoxazolyl)phenoxy]-3-(2-hydroxy-1,1-dimethylethylamino)-2-propanol hydrogen oxalate, M.P. 168–170° C.

*Example 13*

A mixture of 170 parts of 4-(4-hydroxyphenyl)thiazole, 100 parts of epichlorohydrin, 43 parts of sodium hydroxide and 5000 parts of water is stirred for 6 hours at ambient temperature. The mixture is extracted with 15,000 parts of ethyl acetate and the extract is dried with anhydrous magnesium sulphate. The ethyl acetate is evaporated and there is thus obtained impure 1,2-epoxy-3-[4-(4-thiazolyl)phenoxy]propane. This impure epoxide is dissolved in 2500 parts of isopropylamine, and the solution is heated under reflux for 3 hours. The excess of isopropylamine is evaporated, and the residual solid is extracted with 3000 parts of 2 N-hydrochloric acid. The acidic extract is neutralised with 2 N-sodium bicarbonate solution, and the solution is evaporated to dryness. The residue is extracted with 15,000 parts of ethyl acetate, the extract is filtered, and the filtrate is evaporated. The residue is crystallised from petroleum ether (B.P. 60–80° C.). There is thus obtained 1-isopropylamino-3-[4-(4-thiazolyl)phenoxy]-2-propanol, M.P. 99–100° C.

*Example 14*

A mixture of 176 parts of 2-(3-hydroxyphenyl)thiophene, 100 parts of epichlorohydrin, 43 parts of sodium hydroxide and 5000 parts of water is stirred at ambient temperature for 14 hours. The mixture is extracted with 15,000 parts of chloroform. The chloroform extract is evaporated and there is thus obtained impure 1,2-epoxy-3-[3-(2-thienyl)phenoxy]propane. This impure epoxide is dissolved in 2500 parts of isopropylamine, and the solution is heated under reflux for 5 hours. The excess of isopropylamine is evaporated and the residue is extracted with 2000 parts of 2 N-hydrochloric acid. The extract is filtered and the filtrate is neutralised with 2 N-sodium bicarbonate solution and kept at ambient temperature for 18 hours. The resulting mixture is filtered and the solid residue is crystallised from petroleum ether (B.P. 60–80° C.). There is thus otbained 1-isopropylamino-3-[3-(2-thienyl)phenoxy]-2-propanol, M.P. 110–111° C.

*Example 15*

A mixture of 0.2 part of 1-[2-(2-benzoxazolyl)-phenoxy]-3-isopropylamino-2-propanol and 6 parts of acetyl chloride is heated under reflux for 3 hours. The mixture is then evaporated to dryness under reduced pressure and the residue is stirred together with ether. The mixture is filtered and the solid residue is crystallised from benzene. There is thus obtained 2-[2-(2-benzoxazolyl)phenoxyl]-1 - (isopropylaminomethyl)ethyl acetate as its hydrochloride hydrate, M.P. 138–140° C.

*Example 16*

A mixture of 10 parts of 1-[2-(2-benzoxazolyl)-phenoxy-3-isopropylamino-2-propanol and 80 parts of mannitol is passed through a 60-mesh screen. Sufficient of a 10% aqueous solution of gelatin is than added to make a stiff paste. The paste is passed through a 16-mesh screen, dried at 60° C. and then passed through a 20-mesh screen. To the resultant granules are added 6 parts of alginic acid and 2 parts of magnesium stearate. The resultant mixture is compressed into tablets by known means. There are thus obtained tablets suitable for therapeutic purposes.

What we claim is:
1. An alkanolamine derivative selected from the group consisting of compounds of the formulae:

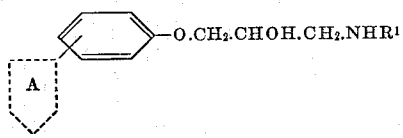

and

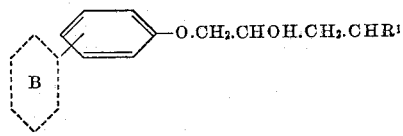

and

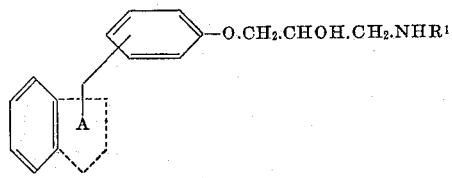

and

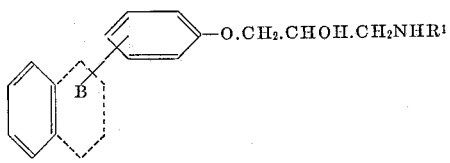

wherein:
ring A represents a 5-membered heteroaromatic ring containing not more than two heteroatoms selected from oxygen, nitrogen and sulphur;
ring B represents a 6-membered heteroaromatic ring containing not more than two heteroatoms selected from oxygen, nitrogen and sulphur; and
$R^1$ is selected from the group consisting of alkyl of not more than 12 carbon atoms, hydroxyalkyl of not more than 4 carbon atoms, cycloalkyl of not more than 5 carbon atoms, alkenyl of not more than 6 carbon atoms, and aralkyl of not more than 15 carbon atoms;
and the esters thereof derived from aliphatic carboxylic acids of not more than 6 carbon atoms;
and the acid-addition salts thereof.

2. A compound as claimed in claim 1 wherein $R^1$ is selected from the group consisting of 2-hydroxy-1,1-dimethylethyl and 1-methyl-3-phenylpropyl.

3. A compound as claimed in claim 1 in which the heterocyclic substituent is selected from the group consisting of 2-pyridyl, 2-indolyl, 2-benzoxazolyl, 2-benzthiazolyl, 2-quinolyl, 2-quinoxalyl, 4-thiazolyl and 3-thienyl.

4. A compound as claimed in claim 1 selected from the group consisting of 1-[2-(2-benzoxazolyl)-phenoxy]-3-isopropylamino-2-propanol and the acid addition salts thereof.

5. A compound as claimed in claim 1 selected from the group consisting of 1-[2-(2-benzoxazolyl)-phenoxy]-3-(2-hydroxy-1,1-dimethylethylamino) - 2 - propanol and the acid addition salts thereof.

6. A compound as claimed in claim 1 selected from the group consisting of 1-[2-(2-benzoxazolyl)-phenoxy]-3-t-butylamino-2-propanol and the acid addition salts thereof.

References Cited
UNITED STATES PATENTS

| | | | |
|---|---|---|---|
| 2,509,453 | 5/1950 | Russell | 260—304 |
| 2,515,913 | 7/1950 | Vanzandt et al. | 260—304 |
| 3,137,625 | 6/1964 | Biel | 167—65 |
| 3,143,469 | 8/1964 | Debay et al. | 167—65 |

OTHER REFERENCES

Burger: Medicinal Chemistry, vol. I, 1951, p. 345.

ALEX MAZEL, *Primary Examiner.*

HENRY R. JILES, *Examiner.*

RICHARD J. GALLAGHER, *Assistant Examiner.*